(12) United States Patent
Tokuda et al.

(10) Patent No.: US 11,142,485 B2
(45) Date of Patent: Oct. 12, 2021

(54) CIRCUMFERENTIAL COATING MATERIAL, CIRCUMFERENTIAL COATED HONEYCOMB STRUCTURE

(71) Applicant: NGK INSULATORS, LTD., Nagoya (JP)

(72) Inventors: Shingo Tokuda, Nagoya (JP); Shuji Ueda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 789 days.

(21) Appl. No.: 15/906,173

(22) Filed: Feb. 27, 2018

(65) Prior Publication Data

US 2018/0273432 A1 Sep. 27, 2018

(30) Foreign Application Priority Data

Mar. 22, 2017 (JP) .............................. JP2017-055722

(51) Int. Cl.
*C04B 38/00* (2006.01)
*C04B 41/87* (2006.01)
(Continued)

(52) U.S. Cl.
CPC ...... *C04B 38/0006* (2013.01); *B01D 46/2444* (2013.01); *B01D 46/2462* (2013.01);
(Continued)

(58) Field of Classification Search
None
See application file for complete search history.

(56) References Cited

U.S. PATENT DOCUMENTS

| 5,629,067 A | 5/1997 | Kotani et al. |
| 2006/0019061 A1* | 1/2006 | Oshimi ............. B01D 46/2429 428/116 |

(Continued)

FOREIGN PATENT DOCUMENTS

| DE | 100 31 123 A1 | 4/2002 |
| JP | 2613729 B2 | 5/1997 |

(Continued)

OTHER PUBLICATIONS

Machine translation from Espace.net of JP 2000273729A (translated Nov. 2, 2020) (Year: 2000).*

(Continued)

Primary Examiner — David Sample
Assistant Examiner — Elizabeth Collister
(74) Attorney, Agent, or Firm — Burr & Brown, PLLC

(57) ABSTRACT

A circumferential coating material to be applied to a circumferential surface of a honeycomb structure made of ceramics formed by extrusion, the circumferential coating material including a ceramic raw material that forms a circumferential coating layer,
wherein the ceramic raw material contains:
a ceramic mixture of first ceramic particles having particulate shapes, and second ceramic particles having particulate shapes and an average particle diameter different from an average particle diameter of the first ceramic particles; and
a fiber material having an elongated strip-like shape,
wherein the ceramic mixture has particle size distribution including at least two local maximum values, and
the fiber material has an average fiber length ranging from 30 to 100 μm in a longitudinal direction.

4 Claims, 2 Drawing Sheets

(51) Int. Cl.
    *C04B 41/00*     (2006.01)
    *C04B 41/50*     (2006.01)
    *B01J 37/02*     (2006.01)
    *B01J 35/04*     (2006.01)
    *C04B 41/86*     (2006.01)
    *B01D 46/24*     (2006.01)
    *B01D 53/86*     (2006.01)
    *C04B 111/00*     (2006.01)

(52) U.S. Cl.
    CPC ........... *B01J 35/04* (2013.01); *B01J 37/0215* (2013.01); *C04B 38/0009* (2013.01); *C04B 41/009* (2013.01); *C04B 41/5024* (2013.01); *C04B 41/86* (2013.01); *C04B 41/87* (2013.01); *B01D 46/247* (2013.01); *B01D 46/2451* (2013.01); *B01D 53/86* (2013.01); *B01D 2255/915* (2013.01); *C04B 2111/00793* (2013.01)

(56) References Cited

U.S. PATENT DOCUMENTS

2010/0009117 A1* 1/2010 Okazaki .............. C04B 41/5089
    428/116

2012/0225768 A1   9/2012  Kono et al.
2013/0224430 A1   8/2013  Chapman et al.
2015/0344375 A1  12/2015  Chapman et al.

FOREIGN PATENT DOCUMENTS

| JP | 2000-279729 | A1 | 10/2000 |
| JP | 2000279729 | A * | 10/2000 |
| JP | 2001-329836 | A1 | 11/2001 |
| JP | 2002-070545 | A1 | 3/2002 |
| JP | 5345502 | B2 | 11/2013 |
| JP | 2015-513516 | A1 | 5/2015 |

OTHER PUBLICATIONS

German Office Action (Application No. 10 2018 203 435.4) dated Jul. 25, 2019 (with English translation).
German Office Action (Application No. 10 2018 203 435.4) dated Mar. 12, 2019 (with English translation).
Japanese Office Action (Application No. 2017-055722) dated Jun. 18, 2019 (with English translation).
Japanese Office Action (Application No. 2017-055722) dated Nov. 12, 2019 (with English translation).

* cited by examiner

CIRCUMFERENTIAL COATING MATERIAL, CIRCUMFERENTIAL COATED HONEYCOMB STRUCTURE

The present application is an application based on JP-2017-055722 filed on Mar. 22, 2017 with Japan Patent Office, the entire contents of which are incorporated herein by reference.

BACKGROUND OF THE INVENTION

Field of the Invention

The present invention relates to a circumferential coating material and a circumferential coated honeycomb structure. More particularly, the present invention relates to a circumferential coating material to be applied to a honeycomb structure and used for forming a circumferential coating layer, and a circumferential coated honeycomb structure including a circumferential wall made of the circumferential coating layer.

Description of the Related Art

In the related art, a ceramic honeycomb structure has been used in a wide variety of applications such as a catalyst carrier for automobile exhaust gas purification, a diesel particulate filter, a gasoline particulate filter, and a heat reservoir for a combustion apparatus. The ceramic honeycomb structure herein (hereinafter simply referred to as the "honeycomb structure") is manufactured by extrusion from an extrusion die (die), using a honeycomb-formed-body manufacturing apparatus so as to obtain a honeycomb formed body, and further firing the honeycomb structure in a firing furnace at a high temperature. Accordingly, it is possible to obtain the honeycomb structure that includes porous partition walls defining a plurality of cells extending from one end face to the other end face to form fluid flow paths.

In recent years, there is demand for an improvement in purification performance of a honeycomb structure used in a catalyst carrier for purification of exhaust gases from automobile engines, or in particulate filters so as to comply with exhaust gas regulations which are reinforced year by year in consideration of environmental problems. Such demand requires a reduction in honeycomb structure weight so as to increase a rate of temperature rise of a catalyst loaded on the honeycomb structure and to activate the catalyst in early stage. Therefore, the following techniques are under development: "thickness reduction" to reduce a thickness of porous partition walls of a honeycomb structure, and "porosity enhancement" to further increase porosity of the porous partition walls. The term "porosity enhancement" is defined herein as a case where the porous partition walls have the porosity of 50% or more.

On the other hand, the thickness reduction and porosity enhancement of the honeycomb structure may cause such a disadvantage that the honeycomb structure reduces its mechanical strength. In other words, as compared with the related art, the mechanical strength of the partition walls may be decreased because of the thickness reduction, the porosity enhancement, and the likes.

Due to a decrease in mechanical strength, even when a weak shock is applied to the honeycomb structure from the outside, cracks or breakage may be generated in the partition walls. Such cracks or breakage in the partition walls of the honeycomb structure due to a shock impairs basic functions of the honeycomb structure when being used as a catalyst carrier for automobile exhaust gas purification and the likes. Therefore, it is desired to enhance porosity of a honeycomb structure and to develop a honeycomb structure with sufficient mechanical strength for practical use.

There is also demand for manufacturing a honeycomb structure suitable for various industrial technical fields so that a honeycomb structure having a larger honeycomb diameter than usual is under development. Forming the large-sized honeycomb structure monolithically by extrusion causes instability, particularly, in shape of partition walls of a circumferential edge, which may decrease accuracy in product shape and dimension of the honeycomb structure.

In order to solve such problems, the following technique has been employed (see, for example, Patent Documents 1 and 2). That is, a circumferential surface of an extruded honeycomb structure is ground with a grinding wheel and the likes, and after a honeycomb diameter is uniformed, a circumferential coating material containing a powdery ceramic raw material and prepared in a slurry state is applied to the circumferential surface (ground surface) of the honeycomb structure, being dried or fired so as to provide the honeycomb structure with a circumferential coating layer (a circumferential wall). Accordingly, even in a large-sized honeycomb structure having a large honeycomb diameter, it is possible to stabilize the product shape and the likes.

As described above, as the honeycomb structure is provided with the circumferential coating layer (circumferential wall), it is possible to improve the mechanical strength of the honeycomb structure (circumferential coated honeycomb structure). Furthermore, the honeycomb diameter is adjusted by grinding in advance, and then, the circumferential coating material is uniformly applied to the honeycomb structure so that the aforementioned technique has excellent advantages not only in improvement of mechanical strength (improvement of shock resistance) but also in stabilization of accuracy in product shape and dimension. Still further, a honeycomb structure that includes a circumferential coating layer with a layer surface being subjected to a special treatment has been disclosed (see Patent Document 3).

[Patent Document 1] JP 2613729 B1
[Patent Document 2] JP 5345502 B1
[Patent Document 3] JP 2002-70545 A

SUMMARY OF THE INVENTION

In using a honeycomb structure as a catalyst carrier for automobile exhaust gas purification and the likes, it is often the case that the honeycomb structure is used while being housed in a metal can body (can). Therefore, a housing process (canning process) is conducted to house the honeycomb structure in the can body. A housing space formed inside the can body during this process is slightly larger than the honeycomb structure so that a large load may be applied to the honeycomb structure during canning.

In a case where the honeycomb structure housed in the can body is strongly prevented from moving in the housing space, force to be applied to the honeycomb structure increases, which may cause cracks and the like in partition walls. Therefore, a cushioning material such as a non-expansion mat is generally interposed between the can body and the honeycomb structure. Accordingly, the honeycomb structure can be stably housed inside the can body while being prevented from moving inside the housing space. Furthermore, even when an external shock is applied to the can body, the honeycomb structure is provided with the can body and the cushioning material so that it is possible to relax the shock with the can body and the cushioning material, which makes it possible not to propagate the shock directly to the honeycomb structure.

Meanwhile, in mounting the honeycomb structure on an automobile as the catalyst carrier for automobile exhaust gas purification, the honeycomb structure housed in the can body may be subjected to relatively large force due to vibration generated while the automobile is running or due to pressure of the exhaust gas (gas pressure) that passes through the honeycomb structure at the time of gas exhaustion.

Being continuously subjected to such vibration and gas pressure, the honeycomb structure which is initially stable at the time of housing in the can body may be "shifted" from an initial position immediately after housing. In particular, it is often the case that a conventional circumferential coated honeycomb structure is configured to include a circumferential coating layer having a relatively smooth layer surface, causing a low friction coefficient between the layer surface and an inner circumferential surface of a can body or a cushioning material such as a non-expansion mat so that there is a high possibility of slippage in a boundary between the layer surface and the can body or the cushioning material.

When "positional shift" occurs, that is, when the honeycomb structure changes its position from the initial position, a strong shock is applied to the circumferential coated honeycomb structure due to vibration during running, which may cause problems such as cracks and breakage in the circumferential coating layer or in the partition walls. These troubles may lead to an increase in pressure loss when processing the exhaust gas of the automobile, affecting engine performance and fuel economy performance or seriously decreasing purification performance as the catalyst carrier for automobile exhaust gas purification.

Therefore, it is expected to develop a honeycomb structure having sufficient mechanical strength in housing into a can body or in running (in use) and having no positional shift inside the can body and no cracks and the like caused by the positional shift, or to develop a circumferential coating layer (circumferential coating material) capable of solving the aforementioned problems. Neither Patent Document 1 nor Patent Document 2 mentions any solutions to these problems.

On the other hand, Patent Document 3 discloses a honeycomb structure, including a circumferential surface provided with irregularities. However, this case requires a new process and a special processing device to be introduced in the new process in order to provide the circumferential surface of the honeycomb structure with irregularities. Such requirements tend to complicate a method for manufacturing a honeycomb structure and lengthen manufacture time. In addition, the requirement of the new processing device involves a problem such as an increase in facility cost.

In view of such situations, an object of the present invention is to provide a circumferential coating material offering sufficient mechanical strength and capable of preventing positional shift of a honeycomb structure inside a can body due to vibration and the like during running, and to provide a circumferential coated honeycomb structure including a circumferential coating layer made of the circumferential coating material.

According to an embodiment of the present invention, there are provided the following circumferential coating material and circumferential coated honeycomb structure.

According to a first aspect of the present invention, a circumferential coating material is provided to be applied to a circumferential surface of a honeycomb structure made of ceramics formed by extrusion, the circumferential coating material including a ceramic raw material that forms a circumferential coating layer, wherein the ceramic raw material contains: a ceramic mixture of first ceramic particles having particulate shapes, and second ceramic particles having particulate shapes and an average particle diameter different from an average particle diameter of the first ceramic particles; and a fiber material having an elongated strip-like shape, wherein the ceramic mixture has particle size distribution including at least two local maximum values, and the fiber material has an average fiber length ranging from 30 to 100 µm in a longitudinal direction.

According to a second aspect of the present invention, the circumferential coating material according to the first aspect is provided, wherein the particle size distribution of the ceramic mixture includes a first local maximum value ranging from 5 to 70 µm and a second local maximum value ranging from 40 to 280 µm.

According to a third aspect of the present invention, the circumferential coating material according to the first or second aspects is provided, wherein the fiber material is a crystalline inorganic fiber.

According to a fourth aspect of the present invention, the circumferential coating material according to any one of the first to third aspects is provided, wherein the first ceramic particles and the second ceramic particles are similar in component.

According to a fifth aspect of the present invention, a circumferential coated honeycomb structure using the circumferential coating material according to any one of the first to fourth aspects is provided, the circumferential coated honeycomb structure including: a honeycomb structure made of ceramics, including porous partition walls configured to define a plurality of cells that extends from one end face to the other end face to form a fluid flow path; and a circumferential coating layer formed by applying the circumferential coating material to at least a part of a circumferential surface of the honeycomb structure.

According to the sixth aspect of the present invention, the circumferential coated honeycomb structure according to the fifth aspect is provided, wherein the circumferential coating layer has a maximum height roughness Rz ranging from 50 to 250 µm.

A circumferential coating material according to an embodiment of the present invention is formed, using a ceramic mixture that contains two kinds of ceramic particles (first ceramic particles and second ceramic particles) having different average particle diameters, thereby providing a surface of a circumferential coating layer with irregularities. Forming the irregular surface on the circumferential coating layer and setting a maximum height roughness in a certain range increase a friction coefficient and increase frictional force between the surface and a metal can body and the like.

Accordingly, a circumferential coated honeycomb structure housed in the can is not easily shifted from an initial position by application of vibration and the like during running. Furthermore, providing the circumferential coating layer enhances mechanical strength of the circumferential coated honeycomb structure itself, which generates no cracks in partition walls even when a shock is applied during canning or running.

DETAILED DESCRIPTION OF THE PRESENT INVENTION

Figure 1:
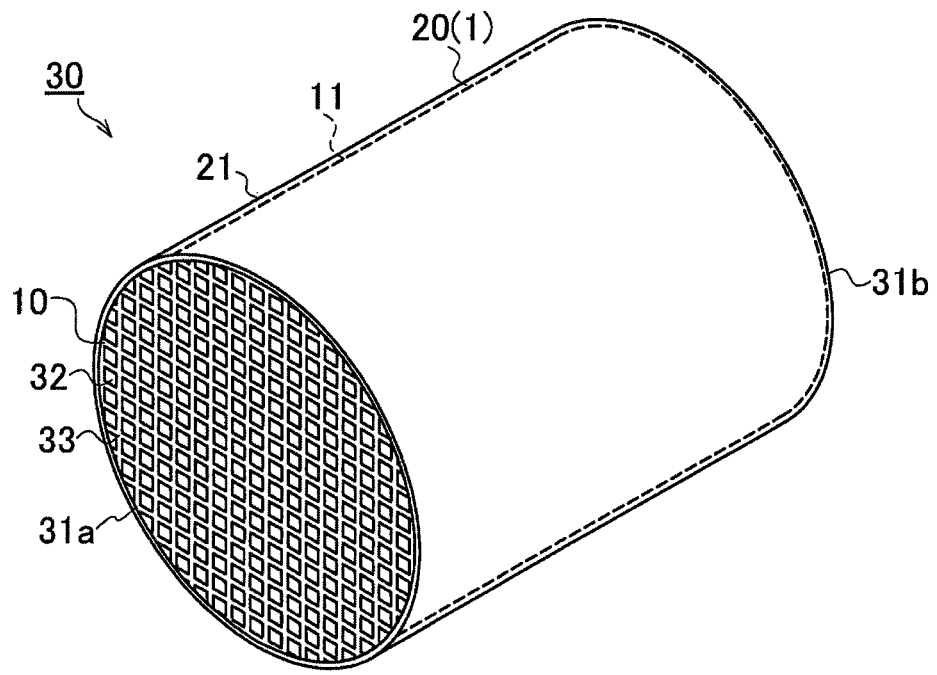
FIG. 1 is a perspective view schematically showing an example of a circumferential coated honeycomb structure according to an embodiment of the present invention.

Hereinafter, an embodiment of a circumferential coating material and a circumferential coated honeycomb structure of the present invention will be described with reference to the drawings. The present invention is not limited to the following embodiment, but can be modified, corrected, or improved without departing from the scope of the present invention.

A circumferential coating material 1 according to an embodiment of the present invention is a slurry matter mainly containing a ceramic raw material 2 and can be applied to a circumferential surface 11 of a ceramic honeycomb structure 10 monolithically formed by extrusion. As the circumferential coating material 1 is uniformly applied to the circumferential surface 11, a circumferential coating layer 20 having a predetermined thickness is provided on the circumferential surface 11.

As shown in FIG. 1, a circumferential coated honeycomb structure 30 according to an embodiment of the present invention includes the nearly round pillar-shaped ceramic honeycomb structure 10 monolithically formed by extrusion; and the circumferential coating layer 20 (corresponding to a circumferential wall) formed to have a predetermined thickness by uniformly applying the circumferential coating material 1 along the circumferential surface 11 of the honeycomb structure 10. The circumferential coated honeycomb structure 30 (or the honeycomb structure 10) includes porous partition walls 33 configured to define a plurality of cells 32 extending from one end face 31a to the other end face 31b to form fluid flow paths. The circumferential coated honeycomb structure 30 may also be configured as a circumferential coated and plugged honeycomb structure provided with plugging portions (not shown in the drawing) to respectively plug the cells 32 on one end face 31a and the residual cells 32 on the other end face 31b in accordance with a predetermined arrangement standard.

In the circumferential coating material 1 according to this embodiment, for example, particulate cordierite, silicon carbide, and titanium oxide may be used as the ceramic raw material 2. It should be noted the ceramic raw material 2 may be the same as a main component of a ceramic raw material contained in the honeycomb structure 10 that forms the circumferential coating layer 20. Known materials such as a pore former, a binder, a surfactant, and a dispersing medium are mixed to the particulate ceramic raw material 2 at a predetermined compounding ratio so as to form the circumferential coating material 1 in a slurry state which is prepared to have suitable viscosity for application to the circumferential surface 11 of the honeycomb structure 10. Since the basic component of the circumferential coating material 1 is already known, a detailed description on the basic component will be omitted here.

Hereinafter described is a case where particulate cordierite is used as an exemplary main component of the ceramic raw material 2 contained in the circumferential coating material 1 according to this embodiment. However, the ceramic raw material 2 of the circumferential coating material 1 of the present invention is not limited to the particulate cordierite.

In regard to the honeycomb structure 10 (a part of the circumferential coated honeycomb structure 30) formed with the circumferential coating layer 20, a forming material (kneaded material) containing a conventionally known ceramic raw material such as cordierite and silicon carbide is prepared in advance, and after being extruded from an extrusion die (die) to have a desired honeycomb shape, the forming material is dried, cut, and fired, thereby manufacturing the honeycomb structure 10. Since the component of the honeycomb structure 10 is already known, a detailed description on the component will be omitted here.

Figure 2:
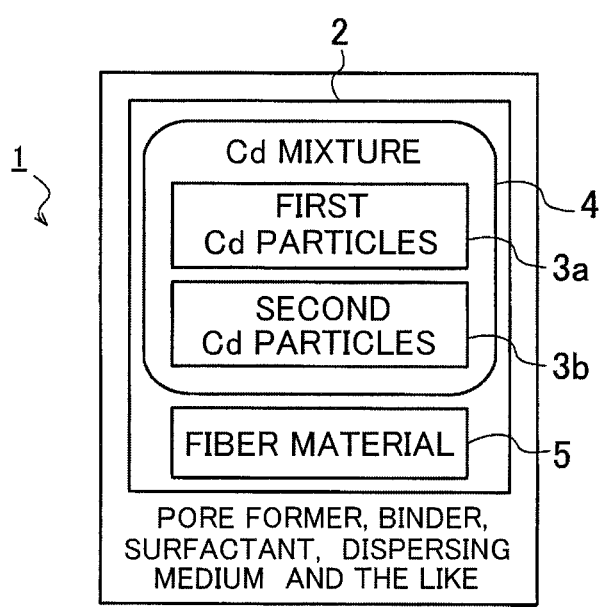
FIG. 2 is an explanatory view schematically showing composition of a circumferential coating material.

As schematically shown in FIG. 2, the circumferential coating material 1 according to this embodiment mainly contains cordierite as the ceramic raw material 2. Furthermore, the cordierite herein is configured as a cordierite mixture 4 (hereinafter referred to as a "Cd mixture 4") that contains particulate first cordierite particles 3a (hereinafter referred to as "first Cd particles 3a") and particulate second cordierite particles 3b (hereinafter referred to as "second Cd particles 3b") having an average particle diameter different from that of the first Cd particles 3a (see FIG. 2).

Herein, the first Cd particles 3a correspond to first ceramic particles in the present invention, the second Cd particles 3b correspond to second ceramic particles in the present invention, and the Cd mixture 4 corresponds to a ceramic mixture in the present invention. In this embodiment, the first and second ceramic particles are described using cordierite of the same component, but the present invention is not limited thereto. The first and second ceramic particles may contain different components. For example, particulate cordierite and particulate silicon carbide may be separately used as the first and second ceramic particles.

Figure 3:
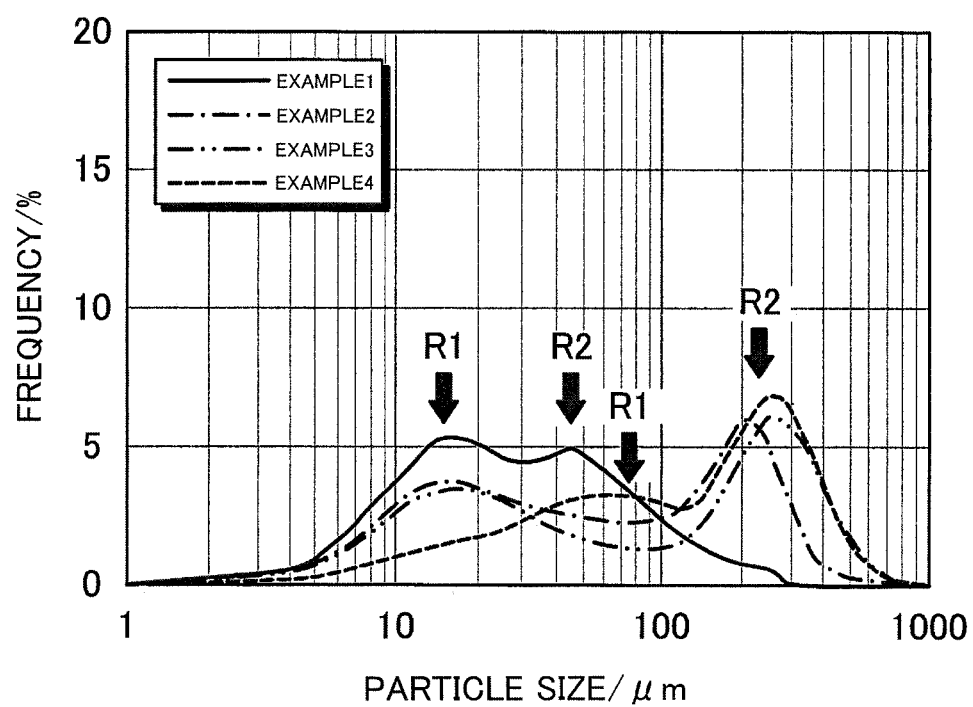
FIG. 3 is a graph showing particle size distribution according to Examples 1 to 4.

The first Cd particles 3a and the second Cd particles 3b have different average particle diameters so that particle size distribution in the Cd mixture 4, a mixture of these two kinds of Cd particles 3a and 3b, indicates two local maximum values R1 and R2 respectively derived from the Cd particles 3a and 3b (see FIG. 3).

The first local maximum value R1 in the particle size distribution of the Cd mixture 4 used herein is preferably ranging from 5 to 70 μm, more preferably from 10 to 60 μm, and still more preferably from 15 to 40 μm. On the other hand, the second local maximum value R2 in the particle size distribution used herein is preferably ranging from 40 to 280 μm, more preferably from 50 to 250 μm, and still more preferably from 65 to 230 pun.

Since the ceramic raw material 2 which is the main component of the circumferential coating material 1 contains the Cd mixture 4, the mixture of at least two kinds of ceramic particles (the first Cd particles 3a, and the second Cd particles 3b) having different average particle diameters, when the circumferential coating material 1 of this embodiment is applied to the circumferential surface 11, the circumferential coating layer 20 is formed differently from a conventional circumferential coating material.

In other words, it is likely that large irregularities are generated on a layer surface 21 of the circumferential coating layer 20 due to the Cd particles 3a and 3b. Simply stated, the layer surface 21 of the circumferential coating layer 20 is rough. On the other hand, the conventional circumferential coating material is assumed to employ a ceramic raw material that has a uniform average particle diameter and indicates one local maximum value in particle size distribution so that a layer surface of a (conventional) circumferential coating layer is fine and dense.

As in this embodiment, the circumferential coating material 1 is prepared in such a manner that the particle size distribution of the Cd mixture 4 in the ceramic raw material 2 includes two local maximum values R1 and R2 so that a maximum height roughness Rz of the circumferential coating layer 20 can be easily controlled. In particular, as these two local maximum values R1 and R2 are limited to the aforementioned range of number, it is possible to further adjust the maximum height roughness Rz of the circumferential coating layer 20. It should be noted that when the first local maximum value R1 and the second local maximum value R2 come too close to each other, that is, when the first Cd particles 3a and the second Cd particles 3b have proximate average particle diameters, an effect of mixing the Cd particles 3a and 3b is reduced. Details on the maximum height roughness Rz will be described later.

In the particle size distribution of the Cd mixture 4, proximity of the first local maximum value R1 to the second local maximum value R2 tends to increase overlapping portions. Due to such overlapping portions, the maximum height roughness Rz of the circumferential coating layer 20 may not be so large. Accordingly, as these two local maximum values R1 and R2 are adjusted to fall at least within the above specified ranges so as to be separated from each other, it is possible to secure a sufficient maximum height roughness Rz of the circumferential coating layer 20.

Using the circumferential coating material 1 prepared as described above, it is possible to obtain the circumferential coating layer 20 having the maximum height roughness Rz in a predetermined range. In other words, a friction coefficient in the layer surface 21 of the circumferential coating layer 20 increases. Due to the increased friction coefficient, even when a shock and the like is applied, the circumferential coating layer 20 housed in a metal can body (not shown), being in contact with an inner circumferential surface of the metal can body (or a cushioning material such as a non-expansion mat) can be kept housed in the can body.

In other words, it is possible to avoid a trouble such as "positional shift" in which the circumferential coated honeycomb structure 30 is shifted inside the can body from an initial position. Thus, it is possible to avoid troubles such that the circumferential coated honeycomb structure 30 is broken and that a part of the circumferential coating layer 20 is peeled from the circumferential surface 11 of the honeycomb structure 10 due to noise caused by vibration during running or due to a shock applied by repetitive positional shift.

The maximum height roughness Rz of the circumferential coating layer 20 in the circumferential coated honeycomb structure 30 according to this embodiment is specified in a range from 50 to 250 μm, more preferably from 70 to 240 μm, and still more preferably from 100 to 230 μm. Specifying the maximum height roughness Rz within the above range eliminates the trouble such as the positional shift. When the maximum height roughness Rz exceeds a lower limit of the above range of number, the layer surface 21 of the circumferential coating layer 20 becomes smooth, which decreases the friction coefficient. The maximum height roughness Rz herein is a value obtained as a roughness curve measured with a roughness meter is partially extracted in accordance with a reference length and a sum of the highest part (the highest peak) and the lowest part (the lowest valley) is calculated (JIS B0601).

A decrease in friction coefficient is likely to cause slippage at a boundary between the layer surface 21 and the metal can body or the cushioning material, easily causing the positional shift. On the other hand, when the maximum height roughness Rz exceeds an upper limit of the aforementioned range of number, the maximum height roughness Rz becomes too large, which decreases a contact area between the can body or the like and the circumferential coating layer 20. A decrease in contact area makes it difficult to warp and hold the circumferential coated honeycomb structure 30 stably, which may lead to the positional shift. Therefore, it is preferable that the maximum height roughness Rz of the circumferential coating layer 20 of the circumferential coated honeycomb structure 30 is restricted within the aforementioned range of number.

In addition to the Cd mixture 4 that contains the first Cd particles 3a and the second Cd particles 3b having different average particle diameters as described above, the circumferential coating material 1 according to this embodiment includes an elongated strip-like fiber material 5 in the ceramic raw material 2. The aforementioned particle size distribution indicates the two local maximum values R1 and R2 in the Cd mixture 4, not including the fiber material 5. The fiber material 5 herein has an average fiber length in a longitudinal direction ranging from 30 to 100 μm (see FIG. 2).

As the fiber material 5 is added to the ceramic raw material 2 together with the Cd mixture 4, an outer wall of the circumferential coated honeycomb structure 30 is imparted with elasticity, which prevents damages in the ceramic structure due to thermal stress. An average fiber length over 100 μm makes it difficult to maintain good coatability. An average fiber length below 30 μm makes it difficult to prevent the circumferential coating material 1 from shrinking in a high-temperature region, which may cause damages. Accordingly, as the fiber material 5 is added to the ceramic raw material 2, and as the average fiber length is specified within the aforementioned range, even if a thermal shock and the like is applied, it is possible to avoid troubles such that a part of the circumferential coating layer 20 is broken or peeled from the circumferential surface 11.

The fiber material 5 is not specifically limited, but various inorganic fibers may be employed, and particularly, it is preferable to use a crystalline inorganic fiber. Examples of the fiber material 5 include a fibrous alumina silicate fiber, and a silicon carbide fiber.

As described above, in the circumferential coating material 1 according to this embodiment, the layer surface 21 of the circumferential coating layer 20 can be provided with irregularities, and the irregularities provided on the layer surface 21 of the circumferential coating layer 20 increase the friction coefficient of the circumferential coated honeycomb structure 30, which stably maintains the state of the circumferential coated honeycomb structure 30 housed in the can body.

Hereinafter, Examples of the circumferential coating material and the circumferential coated honeycomb structure of the present invention will be described, but the circumferential coating material and the circumferential coated honeycomb structure of the present invention are not limited to the following Examples.

EXAMPLES (1) Honeycomb Structure

Forming materials were compounded at a predetermined compounding ratio, being mixed and kneaded so as to obtain a forming material (kneaded material). The kneaded material was extruded with an extruder, thereby obtaining a honeycomb formed body. The honeycomb formed body obtained herein was dried, and then fired at a predetermined temperature so as to prepare a honeycomb structure. In Examples herein, the honeycomb structure mainly contains cordierite. The honeycomb structure prepared herein has porous partition walls, and a plurality of cells is defined by the partition walls.

(2) Circumferential Coating Material

As a ceramic raw material, a mixture of two kinds of particulate cordierite particles (Cd mixture) having different average particle diameters was used as a main component, and a pore former and other materials were added to the mixture, thereby preparing circumferential coating materials (according to Examples 1 to 4, and Comparative Examples 1 to 4) to be applied to a circumferential surface of the honeycomb structure prepared in (1). The following Table 1 shows first local maximum values R1 and second local maximum values R2 in particle size distribution of the Cd mixtures. In Examples 1 to 4, an average particle diameter $D_{50}$ of first Cd particles and an average particle diameter $D_{50}$ of second Cd particles are ranging from 14 μm to 40 μm and from 55 to 207 μm, respectively. Furthermore, the first local maximum values R1 are within a range of 13 μm to 59 μm, while the second local maximum values R2 are within a range of 67 μm to 231 μm. In Examples 1 to 4, the ceramic raw material of each circumferential coating material contains a fiber material having an average fiber length of 55 μm (see FIG. 3).

On the other hand, the ceramic raw material in Comparative Example 1 contains a fiber material having an average fiber length of 150 μm, and the ceramic raw material in Comparative Example 2 contains a fiber material having an average fiber length of 20 μm. The ceramic raw material in Comparative Example 3 contains no fiber material, and the ceramic raw material in Comparative Example 4 contains no fiber material and employs a ceramic material having one local maximum value. All of these ceramic raw materials in Comparative Examples 1 to 4 depart from the numerical limitation specified in the circumferential coating material of the present invention. Each circumferential coating material according to Examples 1 to 4 and Comparative Examples 1 to 4 was prepared in such a manner that viscosity fell within a range of 100 to 500 dPa·s while each circumferential coating material was in a state of slurry, containing uniformly dispersed components. Note that the particle size distribution according to Comparative Examples 1 to 4 is not shown in the drawing.

(3) Formation of Circumferential Coating Layer

Each circumferential coating material prepared in (2) was applied to the circumferential surface of the honeycomb structure prepared in (1) so as to form a circumferential coating layer. In Examples herein, a paste-like circumferential coating material was applied to the circumferential surface of the honeycomb structure, being dried for 1 hour with a dryer. In regard to coating on the circumferential surface, various known coating methods may be employed appropriately such as brush painting, dipping, spray coating performed by decreasing viscosity of a coating material, and a coating by slushing.

(4) Evaluation of Circumferential Coating Layer

Evaluation was performed on "coatability to the honeycomb structure" with respect to each formed circumferential coating layer, "maximum height roughness Rz of the circumferential coating layer," "yield temperature," "shift after vibration test," and "peeling after vibration test." Table 1 summarizes the results.

(4-1) Coatability to Honeycomb Structure

A surface of each circumferential coating layer formed in (3) was visually checked. Those without coating unevenness were evaluated as "good," and those with coating unevenness or those having difficulty in coating were evaluated as "poor."

(4-2) Measurement of Maximum Height Roughness Rz of Circumferential Coating Layer With respect to each circumferential coated honeycomb structure according to Examples 1 to 4 and Comparative Examples 1 to 4 (except for Comparative Example 1) which the circumferential coating material was applied to and the circumferential coating layer was formed in, eight positions were measured with a stylus type surface roughness tester (FORM TALYSURF S5K-6, manufactured by Taylor Hobson Ltd.) at intervals of 15 mm along a circumferential direction. Based on the obtained results, each maximum height roughness Rz was calculated. The calculation results are shown in Table 1.

(4-3) Yield Temperature

With a differential detection type thermal dilatometer, a thermal expansion curve from 40° C. to 1000° C. of each circumferential coating material according to Examples 1 to 4 and Comparative Examples 1 to 4 was measured. In the obtained thermal expansion curve, when a local maximum value was observed, the position of the local maximum value was taken as the yield temperature. When no local maximum value was observed, it was taken as "N/A." In measuring the yield temperature, a sample piece obtained by solidifying each circumferential coating material in a predetermined size under uniform conditions was used as a measurement sample. The measurement results of the yield temperature are shown in Table 1.

(4-4) Evaluation on Shift and Peeling of Coating Material after Vibration Test

A non-expansion mat serving as a cushioning material was wound around the circumferential surface of each circumferential coated honeycomb structure formed with the

TABLE 1

|  | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Average Particle Diameter $D_{50}$ of First Cd Particles | μm | 14 | 14 | 14 | 40 | 14 | 40 | 14 | 14 |
| Average Particle Diameter $D_{50}$ of Second Cd Particles | μm | 55 | 168 | 207 | 207 | 207 | 207 | 207 | 32 |
| Average Fiber Length of Fiber Material | μm | 55 | 55 | 55 | 55 | 150 | 20 | — | — |
| First Local Maximum Value R1 | μm | 15 | 13 | 15 | 59 | 15 | 59 | 15 | 15 |
| Second Local Maximum Value R2 | μm | 67 | 200 | 229 | 231 | 229 | 231 | 229 | — |
| Coatability |  | good | good | good | good | poor | good | good | good |
| Maximum Height Roughness Rz | μm | 56 | 188 | 231 | 216 | — | 203 | 228 | 48 |
| Yield Temperature | ° C. | N/A | N/A | N/A | N/A | — | 772 | 765 | 754 |
| Shift after Vibration Test |  | N/A | N/A | N/A | N/A | — | N/A | N/A | found |
| Peeling of Coating Material after Vibration Test |  | N/A | N/A | N/A | N/A | — | N/A | found | found | circumferential coating layer (or around a layer surface of the circumferential coating layer), being pressed into a metal can body and housed therein. The following experiment was conducted: each circumferential coated honeycomb structure was subjected to 40G vibration for consecutive 8 hours, while being housed in the can body. During the experiment, atmospheric gas with a flow rate of 2 Nm$^3$/min was flowed into the can body. After the experiment, for each circumferential coated honeycomb structure, whether it had been shifted from an initial position was visually checked. Furthermore, for each circumferential coated honeycomb structure after the experiment, whether the circumferential coating layer had been broken and whether the circumferential coating layer had peeled off from the circumferential surface of the honeycomb structure were visually checked. The evaluation results are shown in Table 1.

(5) Summary of Evaluation Results

As shown in Table 1, each of the circumferential coated honeycomb structures according to Examples 1 to 4 indicated good coatability, and the maximum height roughness Rz in each Example was found to fall within the range specified in the present invention. Furthermore, no shift nor peeling of the coating material after the vibration test were found. In other words, it was verified that a beneficial effect could be exerted by the circumferential coating material with the Cd mixture (ceramic mixture) employing two kinds of ceramic particles having different average particle diameters (the first ceramic particles, and the second ceramic particles) and having particle size distribution with two local maximum values.

On the other hand, it was found that the circumferential coating material using the fiber material having the average fiber length of 150 μm (Comparative Example 1) led to deterioration in coatability with respect to the honeycomb structure, which disabled formation of the circumferential coating layer. In the circumferential coating material using the fiber material having the average fiber length of 20 μm (Comparative Example 2), only yield temperature was observed. Accordingly, an efficiency was verified in mixing the fiber material having the specified average fiber length to the ceramic raw material of the circumferential coating material together with the ceramic mixture. In regard to a case using no fiber material (Comparative Example 3) and a case using the ceramic raw material having one local maximum value (Comparative Example 4), none of those cases showed good results.

A circumferential coating material and a circumferential coated honeycomb structure according to the present invention can be used for manufacturing a honeycomb structure preferably employable as a carrier or a filter for a catalyst device in various fields such as automobiles, chemistry, electric powers, and steels.

DESCRIPTION OF REFERENCE NUMERALS

1: circumferential coating material, 2: ceramic raw material, 3a: first Cd particles (first cordierite particles, first ceramic particles), 3b: second Cd particles (second cordierite particles, second ceramic particles), 4: Cd mixture (ceramic mixture), 5: fiber material, 10: honeycomb structure, 11: circumferential surface, 20: circumferential coating layer, 21: layer surface, 30: circumferential coated honeycomb structure, 31a: one end face, 31b: the other end face, 32: cell, 33: partition wall, R1: first local maximum value, R2: second local maximum value.

What is claimed is:

1. A circumferential coated honeycomb structure comprising: a honeycomb structure made of ceramics formed by extrusion, including porous partition walls configured to define a plurality of cells that extends from one end face to the other end face to form a fluid flow path, and a circumferential coating layer formed by applying a circumferential coating material to at least part of a circumferential surface of the honeycomb structure, the circumferential coating material including a ceramic raw material that forms the circumferential coating layer, wherein the ceramic raw material contains:
a ceramic mixture of first ceramic particles having particulate shapes, and second ceramic particles having particulate shapes and an average particle diameter different from an average particle diameter of the first ceramic particles; and
a fiber material having an elongated strip-like shape,
wherein the ceramic mixture has particle size distribution including at least two local maximum values,
the fiber material has an average fiber length ranging from 30 to 100 μm in a longitudinal direction, and
wherein the circumferential coating layer has a maximum height roughness Rz ranging from 100 to 250 μm.

2. The circumferential coated honeycomb structure according to claim 1,
wherein the particle size distribution of the ceramic mixture includes a first local maximum value ranging from 5 to 70 μm and a second local maximum value ranging from 40 to 280 μm.

3. The circumferential coated honeycomb structure according to claim 1, wherein the fiber material is a crystalline inorganic fiber.

4. The circumferential coated honeycomb structure according to claim 1, wherein the first ceramic particles and the second ceramic particles are similar in component.

\* \* \* \* \*